(12) United States Patent
Thompson

(10) Patent No.: US 8,411,831 B2
(45) Date of Patent: Apr. 2, 2013

(54) CALL CENTER MAPPING SYSTEM AND METHOD

(75) Inventor: Daniel Thompson, Coudersport, PA (US)

(73) Assignee: Time Warner Cable Inc., New York, NY (US)

( * ) Notice: Subject to any disclaimer, the term of this patent is extended or adjusted under 35 U.S.C. 154(b) by 168 days.

(21) Appl. No.: 13/086,443

(22) Filed: Apr. 14, 2011

(65) Prior Publication Data

US 2012/0263283 A1    Oct. 18, 2012

(51) Int. Cl.
*H04M 15/00* (2006.01)
(52) U.S. Cl. .............................. 379/112.06; 379/114.01
(58) Field of Classification Search ............. 379/112.06, 379/114.01
See application file for complete search history.

(56) References Cited

U.S. PATENT DOCUMENTS

| | | | |
|---|---|---|---|
| 6,445,912 B1 * | 9/2002 | Cole et al. ..................... | 455/406 |
| 2009/0207994 A1 * | 8/2009 | Bruce et al. .............. | 379/221.13 |
| 2010/0150329 A1 * | 6/2010 | Kumar et al. ............ | 379/201.12 |
| 2011/0252275 A1 * | 10/2011 | Gudlavenkatasiva et al. .. | 714/15 |
| 2012/0213354 A1 * | 8/2012 | Gudlavenkatasiva et al. ....................... | 379/201.02 |

* cited by examiner

*Primary Examiner* — Creighton Smith
(74) *Attorney, Agent, or Firm* — The Marbury Law Group, PLLC

(57) ABSTRACT

A call center mapping system and method. Subscriber phone number data and general phone number data are acquired for a geographic area. The subscriber phone number data includes a location code. The general phone number data includes information that associates the number with a carrier type. The subscriber phone number data and the general phone number data are matched to filter and to carrier types that are identified as unreliable predictors of the location of a call center. The filtered data are compared to subscriber address data. The subscriber address data include an address of a subscriber and the location code. The subscriber address data are related to the filtered data 115 using the location code. The resulting data are related to map data to produce geo-encoded map data. The geo-encoded map data relates a physical location to a telephone number and a rate center. A geo-coding processor identifies a rate center boundary by projecting a line between subscriber locations based on the rate center name. The rate center boundary may be rendered on a map that may be graphically displayed or printed.

18 Claims, 2 Drawing Sheets

CALL CENTER MAPPING SYSTEM AND METHOD

BACKGROUND

With the passage of the Telecommunications Act ("the Act") of 1996, incumbent local exchange carriers (ILECs) must provide to a requesting competitive local exchange carrier" (CLEC) nondiscriminatory access to network elements on an unbundled basis and allow the CLEC to combine such network elements in order to provide telecommunications service. ILECs also have a duty to provide to CLECs interconnection with their network for the transmission and routing of telephone exchange service and exchange access. The interconnection contemplated by the Act provides nondiscriminatory access or interconnection to such services or information as are necessary to allow the requesting CLEC to implement local dialing parity, including nondiscriminatory access to telephone numbers, operator service, directory assistance, and directory listing, with no unreasonable dialing delays.

The increasing popularity of high speed data (HSD) over cable and the emergence of voice over IP (VoIP) technology as a viable alternative to the public switched network (PSTN) has provided cable operators an opportunity to offer a full range of VoIP-based telephony services that include custom features and advanced intelligent network services that rival the ILECs. While CLECs are allowed to compete to provide telephone services, the ILECs maintain control of certain elements of the telephone system. In particular, the ILECs define the rate centers that are used for billing and other purposes.

The North American Numbering Plan (NANP), on which all U.S. telephone numbers are currently based, is an integrated telephone numbering plan serving nineteen North American countries that share its resources. The NANP is administered by a North American Numbering Plan Administrator (NANPA). NANP numbers are ten-digit numbers consisting of a three-digit Numbering Plan Area (NPA) code, commonly called an area code, followed by a three digit central office code, also known as exchanges or prefixes, and a four-digit local, or line, number. The format is usually represented as NPA-NXX-XXXX where N is any digit from 2 through 9 and X is any digit from 0 through 9. Each area code is divided geographically into rate centers. A rate center is a geographically specified area that defines where a calling party is calling from and the location where the call is directed to for billing purposes. Each NXX prefix is uniquely associated with a rate center. Thus, a calling party will be billed based on the distance between the rate center associated with the calling party's prefix and the rate center associated with the called party's prefix.

Rate centers are a holdover from the days when a separate switch was needed for almost every community, and so calls between communities—even within a LATA—were "rated" as toll calls. When each rate center corresponded to a discrete switch, every rate center/switch needed its own NXX. But now, a single Class 5 typically serves multiple rate centers. By way of illustration in Maine, 133 rate centers are served by 15 host switches and 13 smaller switches.

Despite the technological realities, the rate center concept still determines the numbering scheme of the wired telephone system. Currently, two different rate centers served out of the same Class 5 switch must each have their own NXX, no matter how few lines each represents. The reason is that the prefix designates the local switching equipment. When a call is placed to NPA-NXX-XXXX, the telephone network examines the area code and prefix in order to route the call to the correct switch. The far-end switch then selects the correct line based on the line number. Because carriers do not typically share a local switch, each prefix must designate the wire center, the location of the switch and the carrier.

Typically, an ILEC selects rate center boundaries which define the geographic borders of the coverage area for each rate center. These boundary sets can be used along with mapping information to determine where in the rate center coverage area a particular phone number (and its associated residence) reside. ILECs have built their existing telephone systems and established central offices (COPs) to service the various rate centers. Therefore, the ILEC can readily determine the rate center associated with a particular number.

A CLEC does not have access to the central office information of the ILEC and thus must resort to mapping geographic phone data to boundary information to determine rate centers. At the edge of these boundary areas it is often difficult to accurately determine on which side of the boundary a particular number falls due to inaccuracies in defining the boundaries or improperly mapping the geographic location of the phone number and associated building.

For CLECs, this inaccuracy may cause new customer orders to be rejected because the new customer is associated with the wrong rate center. Rejected orders cost the CLEC time and money by delaying its ability to provide services to a customer.

SUMMARY

Embodiments are directed to determining a rate center boundary by correlating subscriber data with data available to the public.

DETAILED DESCRIPTION

As used herein, the term "ILEC" refers to an incumbent local exchange carrier. The ILEC is typically the regulated entity that owns and administers an existing access network.

As used herein, the term "CLEC" refers to a competitive local exchange carrier. A CLEC will typically obtain services from an ILEC that controls a specific rate center.

As used herein, the term "rate center" encompasses a geographically specified area that defines where a calling party is calling from and the location where the call is directed to for billing purposes. Each NXX prefix is uniquely associated with a rate center. Thus, a calling party will be billed based on the distance between the rate center associated with the calling party's prefix and the rate center associated with the called party's prefix.

As used herein, "NXX" refers to a central office code, also known as exchanges, prefixes, or simply NXXs. The NXX appear as digits 4, 5 and 6 of a ten-digit geographic North American Numbering Plan telephone number.

Figure 1:
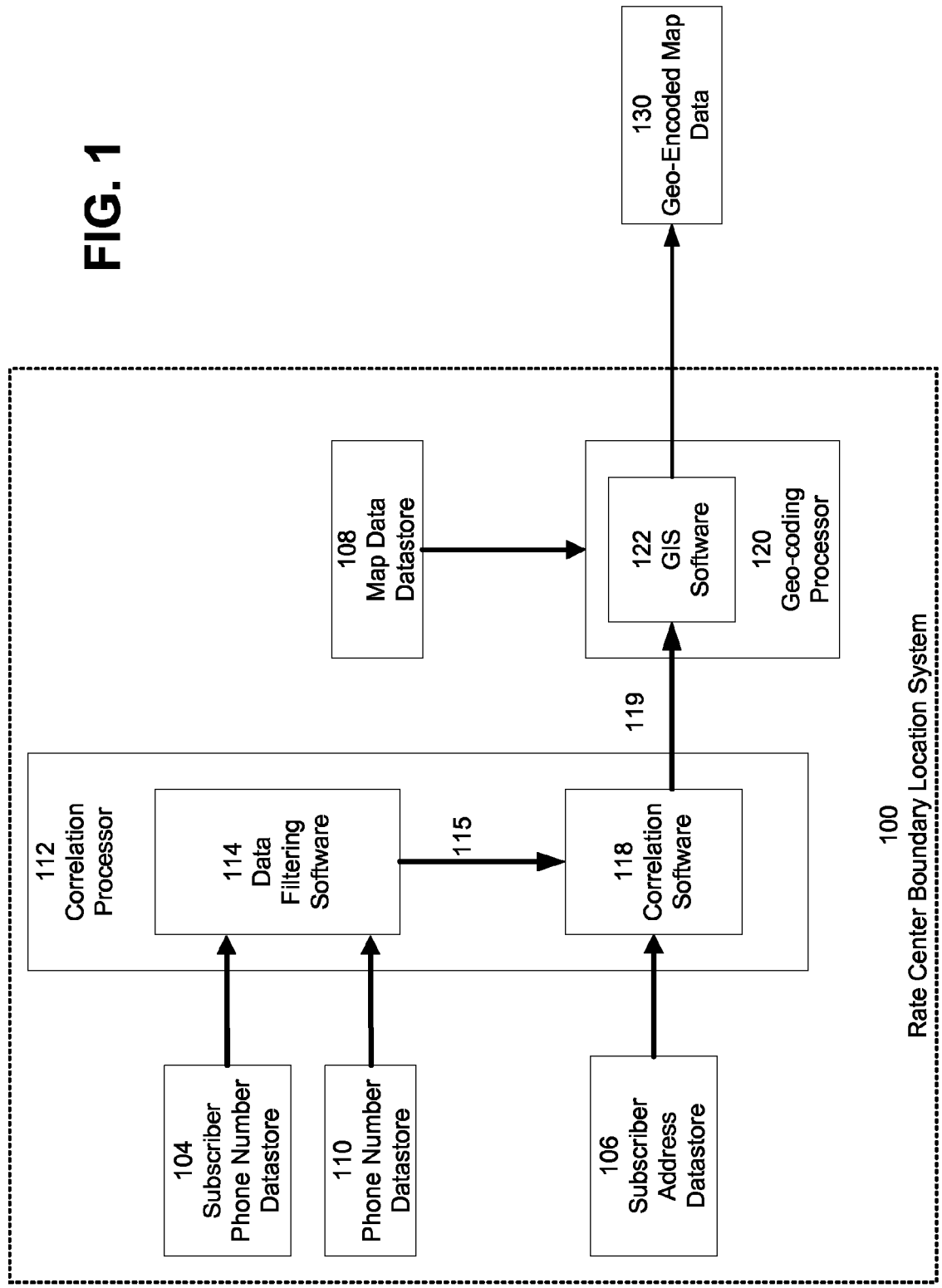
FIG. 1 illustrates a block diagram of a rate center boundary location system according to an embodiment of the present invention.

FIG. 1 illustrates a block diagram of a rate center boundary location system according to an embodiment of the present invention.

In an embodiment, a rate center boundary location system 100 comprises a subscriber phone number datastore 104, subscriber address datastore 106, a map data datastore 108 and a phone number datastore 110. A correlation processor 112 accesses and executes data filtering software 114 and correlation software 118. A geo-coding processor 120 accesses and executes GIS software 122. The elements of the rate center boundary location system 100 are illustrated as discrete components. However, the system is not so limited. In other embodiments, the various elements of the system 100 may be combined without changing the operation of the system 100

In an embodiment, data from datastores 104 and 110 are processed by the correlation processor 112 using data filtering software 114 to produce filtered data 115. The filtered data 115 and data from the subscriber address datastore 106 are processed by the correlation processor 112 using correlation software 118 to produce correlated data 119. The correlated data 119 and data from the map data datastore 108 are processed by the geo-coding processor 120 using GIS software 122 to produce the geo-encoded map data 130.

In an embodiment, the rate center boundary location system 100 is used to produce geo-encoded map data 130 that graphically depicts a boundary of one or more rate centers overlaid on a map. The geo-encoded map data may also graphically depict the location of residences and the rate center to which their associated telephone numbers belong. The geo-encoded map data may be displayed or printed.

Figure 2:
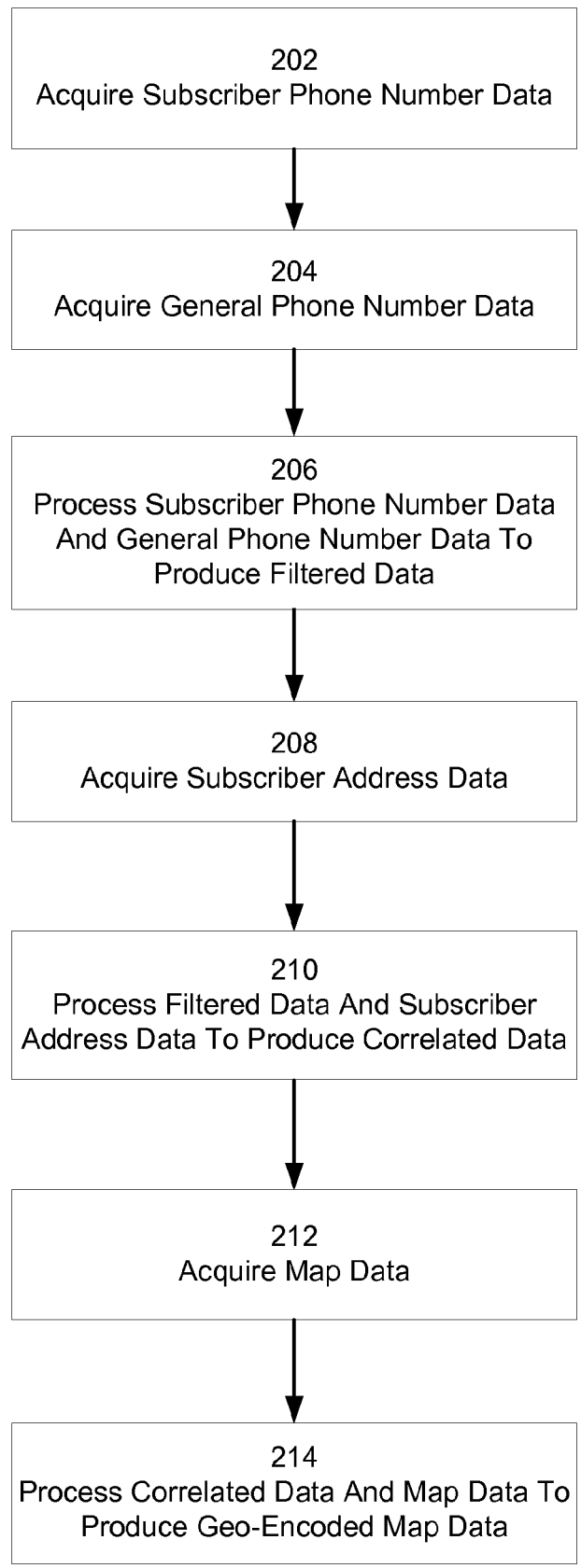
FIG. 2 illustrates a flow diagram of a process by which a rate center boundary is accurately determined according to an embodiment of the present invention.

The operation of the rate center boundary location system according to an embodiment is illustrated in FIG. 2.

Subscriber phone number data are acquired from a subscriber phone number datastore 104. (Block 202.) In an embodiment, the subscriber phone number may be acquired from a billing system or other repository of telephone number data. The subscriber phone number data includes a unique billing ID number. In an embodiment, the unique billing ID number comprises a billing code concatenated with a location code.

General phone number data 110 relating to a geographic area are acquired. (Block 204.) In an embodiment, the general phone number data 110 are acquired from a third party provider. In another embodiment, the general phone number data 110 comprise a telephone number that is associated with a telecom carrier operating company number (OCN) that relates to the carrier that originally issued the telephone number, a carrier type and a rate center name. In an embodiment, the geographic area covered by the general phone number data 110 is selected to match a market of interest that includes the subscriber phone number data.

OCN data may be used to filter subscriber phone number data (as described below).

The subscriber phone number data 104 and the general phone number data 110 are accessed by the data filtering software 114 and processed by correlation processor 112 to produce filtered data 115. (Block 206). In an embodiment, the data filtering software 114 is configured to match the subscriber phone number data to entries in the general phone number data and to filter the matched data according to selected OCN category designators. The OCN carrier type designators are set forth in Table 1:

TABLE 1

| CAP | Competitive Access Provider |
| CLEC | Competitive Local Exchange Carrier |
| GENERAL | Various miscellaneous cases |
| INTL | International |

TABLE 1-continued

| L RESELLER | Local Reseller |
| IC | Interexchange Carrier |
| ILEC | Incumbent Local Exchange Carrier |
| INTRALATA | IntraLATA Service Provider |
| IPES | Internet Protocol Enabled Services |
| P RESELLER | Personal Communication Services Reseller |
| PCS | Personal Communications Service |
| RBOC | Regional Bell Operating Company |
| ULEC | Unbundled Local Exchange Carrier |
| WIRELESS | Wireless Provider (Non-PCS Cellular, Paging, Radio) |
| W RESELLER | Wireless Reseller |

Data that are associated with an OCN category that are considered unreliable predictors of the location of a call center may be discarded. By way of illustration and not by way of limitation, data that are associated with an OCN category of cellphone provider or CLEC are discarded. Alternatively, the filter may be configured to retain data that are associated with an OCN category that is deemed reliable. By way of illustration and not by way of limitation, data that are associated with an OCN category of RBOC or ILEC are saved and the remaining data are discarded. However the filter is configured, the filtered data 115 comprise phone numbers of subscribers associated with an OCN category designator and a unique billing ID.

Subscriber address data 106 are acquired. (Block 208.) The filtered data 115 and the subscriber address data 106 are accessed by the correlation software 118 and processed by correlation processor 112 to produce correlated data 119. (Block 210.) In an embodiment, the subscriber address data comprises a street address of a subscriber and a location code. The correlation software 118 relates the subscriber address data 106 to the filtered data 115 using the location code that is common to the subscriber address data and the billing ID within the filtered data to produce the correlated data 119. For each subscriber phone number provided in the filtered data 115, the correlated data 119 comprise an address, a rate center name, an OCN category designator, and a service provider name.

Map data are acquired. (Block 212.) The correlated data 119 and the map data 108 are accessed by the GIS software 122 and compared by the geo-coding processor 120 to produce geo-encoded map data 130. (Block 214.) The geo-encoded map data 130 relates a physical location to a telephone number and a rate center. In an embodiment, the geo-encoded map data may be updated to include data that are readable by a computer or processor and that may be rendered by a display or a printer so as to indicate the location of each subscriber residence. In another embodiment, the location of each subscriber residence may be graphically displayed or printed as an icon. In an embodiment, the icon is a graphical object having a shape and/or a color that relates the location to a particular rate center.

In an embodiment, the GIS software operates on the geo-coding processor to identify a location of the rate center boundary by projecting a line between subscriber locations based on the rate center name. The rate center boundary may be rendered on a map that may be graphically displayed or printed.

By way of illustration and not by way of limitation, a Local Exchange Routing Guide (LERG) contains information on every telephone switch in North America and identifies the phone numbers each switch covers. The LERG data may include operating company numbers, company names, routing contacts, country code assignments, numbering plan area (NPA) assignments (i.e., area codes), local access and transport area (LATA) codes by region, destination code assignments (NPA NXX thousand-blocks), access tandem codes, switching entity record detail (equipment type, V&H coordinates), including PSTN and IP network elements, rate center details (V&H coordinates) and localities (includes county and postal codes (US) localities), switching homing arrangements (tandem and other switch-to-switch interconnections), operator access tandem codes (ATCs), and location routing numbers.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

An operating environment for the described embodiments may include a processing system with at least one high speed central processing unit ("CPU") or other processing unit and a memory system. The operating environment may be included in a device, computer or server that is used in conjunction with the various embodiments.

It will be appreciated that the acts and symbolically represented operations or instructions include the manipulation of electrical signals by the CPU. An electrical system with data bits causes a resulting transformation or reduction of the electrical signal representation and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium readable by the CPU or other processing unit. The computer readable medium includes cooperating or interconnected computer readable media, which exist exclusively on the processing system or are distributed among multiple interconnected processing systems that may be local or remote to the processing system.

Further, in view of many embodiments to which the principles of the invention may be applied, it should be understood that the illustrated embodiments are exemplary embodiments and should not limit the present invention as defined by the claims. For example, functionality that has been described in reference to a single device may be applied simultaneously or sequentially to any number of devices. Unless specified to the contrary, the steps of the flow charts may be taken in sequence other than those described, and more, fewer or equivalent elements or components could also be used.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A method for determining a boundary of a rate center comprising:
    acquiring subscriber phone number data, wherein for each subscriber phone number the subscriber phone number data comprises a location code;
    acquiring general phone number data relating to a geographic area, wherein for each phone number the general phone number data identifies a carrier type and a rate center name;
    matching, using a correlation processor, the subscriber phone number data to entries in the general phone number data;
    filtering, using the correlation processor, the matched data to produce a set of filtered data that are reliable predictors of a location of a call center;
    acquiring subscriber address data, wherein for each subscriber address the subscriber address data comprise a street address of a subscriber and the location code;
    relating, using the correlation processor, each subscriber phone number in the filtered data to an address using the location code and a rate center name;
    acquiring map data;
    comparing, using a geo-coding processor, the related data and the map data to associate each phone number provided in the filtered data with a location on a map of the geographic area;
    projecting a line between subscriber locations based on the rate center name; and
    rendering a map comprising a graphical representation of the location of each subscriber phone number identified in the filtered data and the projected line.

2. The method of claim 1, wherein the geographic area covered by the general phone number data is selected to match a market of interest.

3. The method of claim 1, wherein filtering, using the correlation processor, the matched data to produce a set of filtered data that are reliable comprises:
    selecting one or more telecom carrier operating company number (OCN) designators as unreliable predictors of the location of a call center; and
    removing from the matched data those data that include one of the one or more selected designators.

4. The method of claim 3, wherein the selected designators are selected from the group consisting of a Wireless Provider and a Competitive Local Exchange Carrier.

5. The method of claim 1, wherein filtering, using the correlation processor, the matched data to produce a set of filtered data that are reliable comprises:
    selecting one or more telecom carrier operating company number (OCN) designators as reliable predictors of the location of a call center; and
    selecting from the matched data those data that include one of the one or more selected designators.

6. The method of claim 5, wherein the selected designators are selected from the group consisting of a Regional Bell Operating Company and an Incumbent Local Exchange Carrier.

7. The method of claim 1, wherein rendering a map comprises rendering a map on a display.

8. The method of claim 1, wherein the graphical representation of the location of each subscriber phone number identified in the filtered data comprises an icon that comprises an attribute that identifies the location by rate center.

9. The method of claim 8, wherein the attribute is selected from the group consisting of a color and a shape.

10. A system for determining a boundary of a rate center comprising:
   a subscriber phone number datastore comprising subscriber phone number data, wherein for each subscriber phone number the subscriber phone number data comprises a location code;
   a general phone number datastore comprising general phone number data relating to a geographic area, wherein for each phone number the general phone number data identifies a carrier type and a rate center name;
   a subscriber address datastore comprising subscriber address data, wherein for each subscriber address the subscriber address data comprise a street address of a subscriber and the location code;
   a map data datastore;
   a correlation processor, wherein the correlation processor is configured with software executable instructions to cause the correlation processor to perform operations comprising:
      acquiring subscriber phone number data from the subscriber phone number datastore;
      acquiring general phone number data from the general phone number datastore;
      matching the subscriber phone number data to entries in the general phone number data;
      filtering the matched data to produce a set of filtered data that are reliable predictors of a location of a call center;
      acquiring subscriber address data from the subscriber address datastore;
      relating each subscriber phone number in the filtered data to an address using the location code and a rate center name;
   a geo-coding processor, wherein the geo-coding processor is configured with software executable instructions to cause the geo-coding processor to perform operations comprising:
      acquiring map data;
      comparing the related data and the map data to associate each phone number provided in the filtered data with a location on a map of the geographic area;
      projecting a line between subscriber locations based on the rate center name; and
      rendering a map comprising a graphical representation of the location of each subscriber phone number identified in the filtered data and the projected line.

11. The system of claim 10, wherein the geographic area covered by the general phone number data is selected to match a market of interest.

12. The system of claim 10, wherein the instruction for filtering the matched data to produce a set of filtered data that are reliable comprises instructions for:
   selecting one or more telecom carrier operating company number (OCN) designators as unreliable predictors of the location of a call center; and
   removing from the matched data those data that include one of the one or more selected designators.

13. The system of claim 12, wherein the selected designators are selected from the group consisting of a Wireless Provider and a Competitive Local Exchange Carrier.

14. The system of claim 10, wherein the instruction for filtering the matched data to produce a set of filtered data that are reliable comprises instructions for:
   selecting one or more telecom carrier operating company number (OCN) designators as reliable predictors of the location of a call center; and
   selecting from the matched data those data that include one of the one or more selected designators.

15. The system of claim 14, wherein the selected designators are selected from the group consisting of a Regional Bell Operating Company and an Incumbent Local Exchange Carrier.

16. The system of claim 10 wherein the system further comprises a display and wherein rendering a map comprises rendering a map on the display.

17. The system of claim 10, wherein the graphical representation of the location of each subscriber phone number identified in the filtered data comprises an icon that comprises an attribute that identifies the location by rate center.

18. The system of claim 17, wherein the attribute is selected from the group consisting of a color and a shape.

* * * * *